USO10188259B2

(12) United States Patent
Lee et al.

(10) Patent No.: US 10,188,259 B2
(45) Date of Patent: Jan. 29, 2019

(54) PUMP AND DISHWASHER PROVIDED WITH PUMP

(71) Applicant: LG ELECTRONICS INC., Seoul (KR)

(72) Inventors: Haewoong Lee, Seoul (KR); Sangheon Yoon, Seoul (KR); Moonkee Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 90 days.

(21) Appl. No.: 14/642,394

(22) Filed: Mar. 9, 2015

(65) Prior Publication Data

US 2016/0000296 A1      Jan. 7, 2016

(30) Foreign Application Priority Data

Jul. 1, 2014   (KR) .................. 10-2014-0081618

(51) Int. Cl.
| | | |
|---|---|---|
| *A47L 15/42* | (2006.01) | |
| *A47L 15/14* | (2006.01) | |
| *F04D 29/06* | (2006.01) | |
| *F04D 29/58* | (2006.01) | |
| *A47L 15/06* | (2006.01) | |
| *F04D 1/00* | (2006.01) | |

(Continued)

(52) U.S. Cl.
CPC .......... *A47L 15/4225* (2013.01); *A47L 15/06* (2013.01); *A47L 15/14* (2013.01); *F04D 1/00* (2013.01);

(Continued)

(58) Field of Classification Search
CPC .... F04D 29/04; F04D 29/0413; F04D 29/043; F04D 1/00; F04D 29/061; F04D 13/026;
(Continued)

(56) References Cited

U.S. PATENT DOCUMENTS 5,160,246 A * 11/1992 Horiuchi ............. F04D 29/0413
                                                    384/223
5,184,946 A    2/1993  Chi-Wei
(Continued)

FOREIGN PATENT DOCUMENTS

| CN | 102342817 A | 2/2012 |
|---|---|---|
| CN | 201372933 Y | 6/2013 |

(Continued)

*Primary Examiner* — David G Cormier
(74) *Attorney, Agent, or Firm* — Birch, Stewart, Kolasch & Birch, LLP

(57) ABSTRACT

A pump includes an inlet chamber for providing a space into which external water is supplied; an outlet chamber provided to be connected with the inlet chamber, guiding the water inside the inlet chamber to the outside of the inlet chamber; an impeller provided inside the outlet chamber, moving the water; a first housing fixed to the outside of the outlet chamber; a rotor rotatably provided inside the first housing; a rotation shaft provided to pass through the outlet chamber, connecting the rotor with the impeller; a magnetic field formation unit provided to surround the first housing, forming a rotating magnetic field to rotate the rotor; a friction bearing provided to pass through the outlet chamber, rotatably supporting the rotation shaft; and an outlet path for connecting the inside of the first housing with the outlet chamber.

6 Claims, 4 Drawing Sheets

(51) Int. Cl.
  *F04D 13/08* (2006.01)
  *F04D 29/041* (2006.01)
  *F16C 33/10* (2006.01)

(52) U.S. Cl.
  CPC .......... *F04D 13/08* (2013.01); *F04D 29/0413* (2013.01); *F04D 29/061* (2013.01); *F04D 29/58* (2013.01); *F16C 33/1045* (2013.01); *F16C 2360/44* (2013.01)

(58) Field of Classification Search
  CPC ............. F04D 13/0626; F04D 13/0633; A47L 15/4225
  See application file for complete search history.

(56) References Cited

U.S. PATENT DOCUMENTS

| | | | | |
|---|---|---|---|---|
| 6,447,269 B1* | 9/2002 | Rexroth | ............... | F04D 13/064 417/365 |
| 2003/0037809 A1* | 2/2003 | Favaro | ............... | A47L 15/0084 134/58 D |
| 2011/0048465 A1* | 3/2011 | Jerg | ............... | A47L 15/0023 134/25.2 |
| 2013/0171012 A1 | 7/2013 | Blankemeier et al. | | |
| 2014/0072459 A1* | 3/2014 | Kalavsky | ............ | F04D 29/0413 417/365 |
| 2014/0127060 A1* | 5/2014 | Richter | ................ | F04D 29/528 417/423.14 |

FOREIGN PATENT DOCUMENTS

| | | | |
|---|---|---|---|
| CN | 103503284 A | 1/2014 | |
| CN | 203374503 U | 1/2014 | |
| CN | 103807181 A | 5/2014 | |
| EP | 2 728 193 A2 | 5/2014 | |
| JP | 3169809 B2 | 5/2001 | |
| JP | 4602234 B2 | 12/2010 | |
| KR | 10-2013-0070275 A | 6/2013 | |
| WO | WO 2012150242 A2 * | 11/2012 | ......... F04D 29/0413 |

* cited by examiner

[Figure 1]
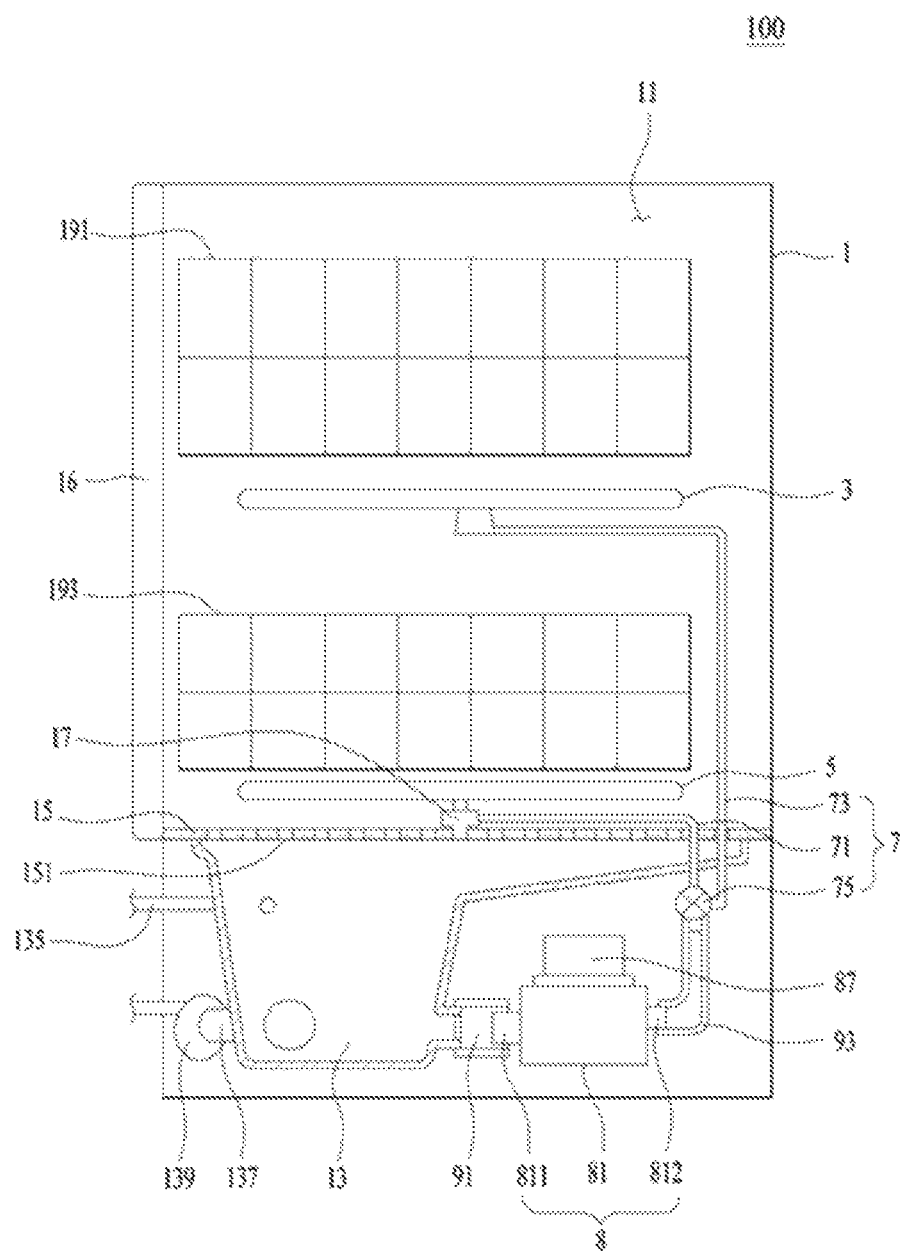

[Figure 2]
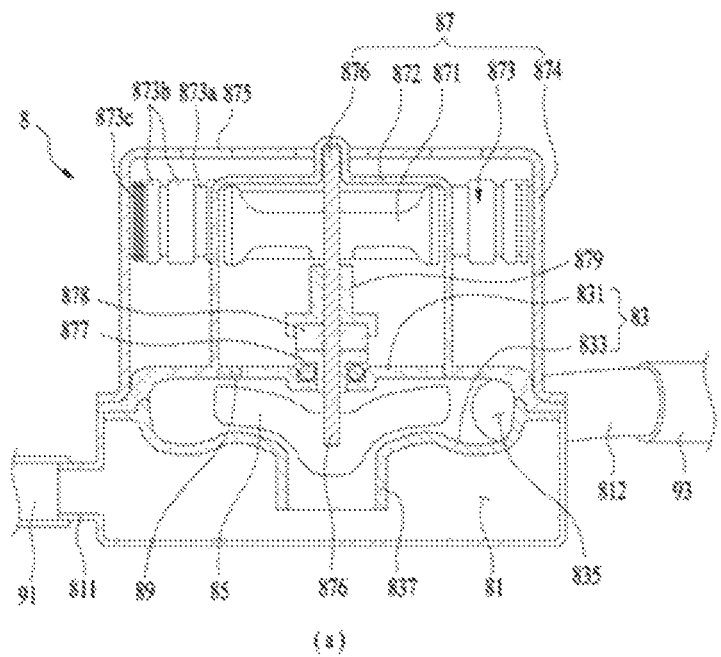
(a)
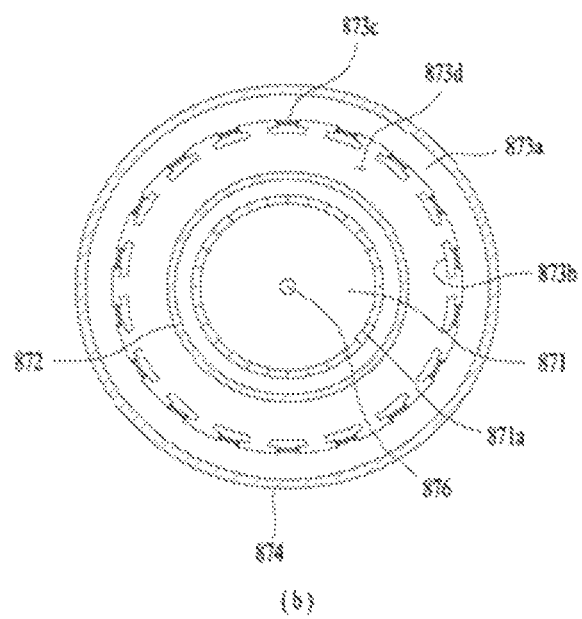
(b)

[Figure 3]
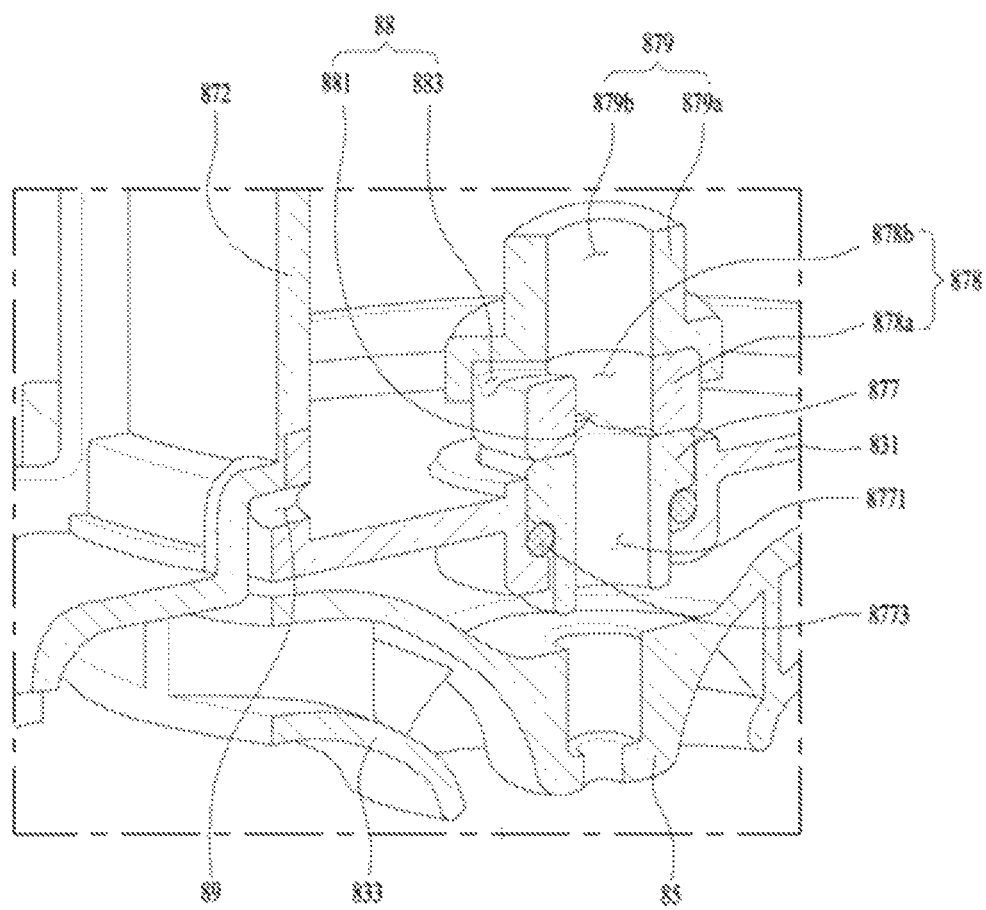

[Figure 4]
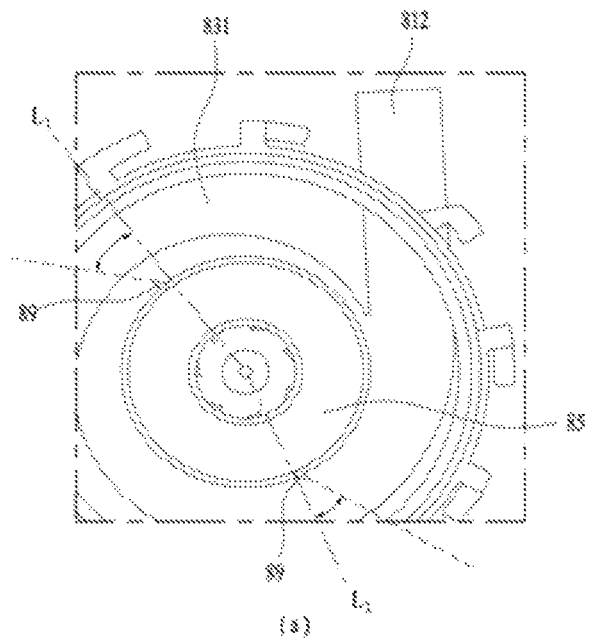
(a)
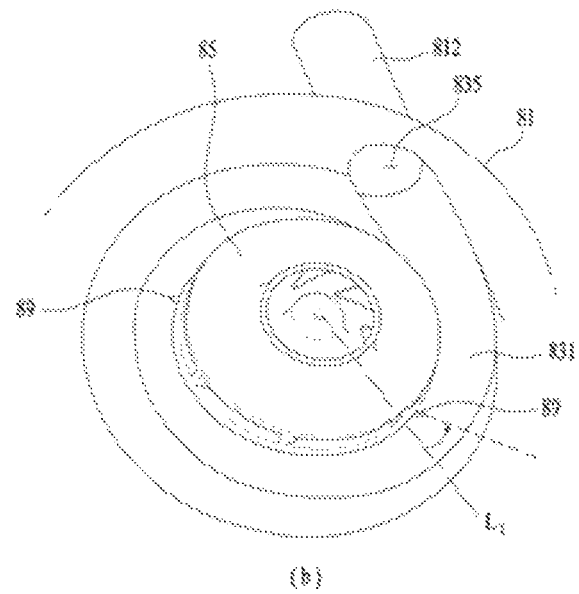
(b)

PUMP AND DISHWASHER PROVIDED WITH PUMP

Pursuant to 35 U.S.C. § 119(a), this application claims the benefit of Korean Patent Application No. 10-2014-0081618, filed on Jul. 1, 2014, which is hereby incorporated by reference in its entirety as if fully set forth herein.

BACKGROUND OF THE INVENTION

Field of the Invention

The present invention relates to a pump and a dishwasher provided with the pump.

Discussion of the Related Art

A dishwasher is an appliance that washes off food leftovers remaining on dishes or cooking utensils (hereinafter, referred to as a 'washing target') by using a detergent and washing water.

A dishwasher includes a tub for providing a washing space, a rack provided inside the tub, in which a washing target is received, a spray arm for spraying the washing water to the rack, a sump for storing the washing water therein, and a pump for supplying the washing water stored in the sump to the spray arm.

The pump provided in a dishwasher according to the related art includes a housing in which the washing water is stored, an impeller provided inside the housing, and a motor provided outside the housing for rotating the impeller.

Since the motor includes a rotation shaft passing through the housing and connected to the impeller, a ball bearing for rotatably supporting the rotation shaft is necessarily required for the housing.

SUMMARY OF THE INVENTION

Accordingly, the present invention is directed to a pump and a dishwasher provided with the pump, which substantially obviate one or more problems due to limitations and disadvantages of the related art.

An object of the present invention is to provide a pump and a dishwasher provided with the pump, in which the pump is provided with a friction bearing.

Another object of the present invention is to provide a pump and a dishwasher provided with the pump, in which a friction bearing is supplied with water to improve its performance and durability.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a pump according to the present invention comprises an inlet chamber for providing a space into which external water is supplied; an outlet chamber provided to be connected with the inlet chamber, guiding the water inside the inlet chamber to the outside of the inlet chamber; an impeller provided inside the outlet chamber, moving the water; a first housing fixed to the outside of the outlet chamber; a rotor rotatably provided inside the first housing; a rotation shaft provided to pass through the outlet chamber, connecting the rotor with the impeller; a magnetic formation unit provided to surround the first housing, forming a rotation magnetic field to rotate the rotor; a friction bearing provided to pass through the outlet chamber, rotatably supporting the rotation shaft; and an outlet path for connecting the inside of the first housing with the outlet chamber.

The pump may further comprise a spacer through which the rotation shaft passes, maintaining a spacing between the rotor and the friction bearing; and a guide path provided in the spacer, guiding the water supplied into a space formed between the rotation shaft and the friction bearing to a contact surface between the spacer and the friction bearing.

The guide path may be provided such that one surface of the spacer in contact with the friction bearing is bent concavely.

The spacer may include a first spacer which is in contact with the friction bearing, and through which the rotation shaft passes, and a second spacer located above the first spacer to support the rotor, through which the rotation shaft passes, and the guide path may be provided at one side of the first spacer which is in contact with the friction bearing and provided at another side of the first spacer which is in contact with the second spacer.

The outlet path may be tilted at a predetermined angle from a straight line vertical to a rotation track of the impeller.

In another aspect of the present invention, a dishwasher comprises a tub for providing a washing space; racks provided inside the tub, providing a space in which washing targets are received; spray arms for spraying the washing water to the racks; a sump in which the washing water is stored; an inlet chamber for providing a space into which the washing water inside the sump is supplied; an outlet chamber provided to be connected with the inlet chamber, guiding the washing water inside the inlet chamber to the spray arms; an impeller provided inside the outlet chamber, moving the washing water to the spray arms; a first housing provided outside the outlet chamber; a rotor rotatably provided inside the first housing; a rotation shaft for connecting the rotor with the impeller by passing through the outlet chamber; a magnetic formation unit provided to surround the first housing, forming a rotation magnetic field to rotate the rotor; a friction bearing provided to pass through the outlet chamber, rotatably supporting the rotation shaft; and an outlet path for connecting the inside of the first housing with the outlet chamber.

The dishwasher may further comprise a spacer through which the rotation shaft passes, maintaining a spacing between the rotor and the friction bearing; and a guide path provided in the spacer, guiding the water supplied into a space formed between the rotation shaft and the friction bearing to a contact surface between the spacer and the friction bearing.

The guide path may be provided on one side of the spacer which is in contact with the friction bearing.

The spacer may include a first spacer which is in contact with the friction bearing, and through which the rotation shaft passes, and a second spacer located above the first spacer to support the rotor, through which the rotation shaft passes, and the guide path may be provided at one side of the first spacer which is in contact with the friction bearing and provided at another side of the first spacer which is in contact with the second spacer.

The outlet path may be tilted at a predetermined angle from a straight line vertical to a rotation track of the impeller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a view illustrating a dishwasher provided with a pump according to the present invention;

FIGS. 2 and 3 are views illustrating a pump according to the present invention; and FIG. 4 is a view illustrating a drainage path provided in a pump.

DETAILED DESCRIPTION OF THE INVENTION

Reference will now be made in detail to the preferred embodiments of the present invention, examples of which are illustrated in the accompanying drawings. Meanwhile, it is to be understood that a configuration of an apparatus, which will be described hereinafter, or a method for controlling the same, are not intended to restrict the scope of the present invention, but are intended to describe the embodiment of the present invention. Wherever possible, the same reference numbers will be used throughout the drawings to refer to the same or like parts.

As shown in FIG. 1, a dishwasher 100 according to the present invention includes a cabinet 1 constituting an external appearance of the dishwasher 100, a tub 11 located inside the cabinet 1 and providing a washing space, racks 191 and 193 provided inside the tub 11 and providing a space in which washing targets are received, spray arms 3 and 5 for spraying the washing water toward the racks, a sump 13 for returning the washing water sprayed into the tub 11, and a pump 8 for supplying the washing water stored in the sump 13 to the spray arms 3 and 5.

The racks 191 and 193 may be considered an upper rack 191 (or first rack) and a lower rack 193 (or second rack) located below the upper rack.

The cabinet 1 is provided with a door 16 for opening and closing the tub 11. The upper rack 191 and the lower rack 193 may be configured to be removable from the cabinet when the door 16 opens the tub 11.

A rail (not shown) for guiding movement of the racks 191 and 193 into and out of the tub 11 is provided in an inner side of the tub 11. The racks 191 and 193 may be provided with a roller (not shown) for supporting the racks 191 and 193 on the rail.

The cabinet 1 is provided with a sump cover 15 that partitions the inner space of the cabinet 1. The tub 11 is located above the sump cover 15, and the sump 13 is located below the sump cover 15.

The sump cover 15 is provided with a plurality of holes 151 passing through the sump cover 15. The washing water inside the tub 11 is returned to the sump 13 through the holes 151.

The sump 13 is supplied with the washing water through a water supply path 135 connected to a water supply source (not shown). The washing water stored in the sump 13 is discharged to the outside of the cabinet 1 through a drainage path 137 and a drainage pump 139.

The spray arms 3 and 5 may be considered a lower spray arm 5 for washing the washing targets provided inside the tub 11 and received in the lower rack 193, and an upper spray arm 3 for washing the washing targets received in the upper rack 191.

The lower spray arm 5 and the upper spray arm 3 are supplied with the washing water through the pump 8 and a supply path 7. The supply path 7 may include a first supply path 71 connected to the lower spray arm 5, a second supply path 73 connected to the upper spray arm 3, and a switching valve 75 selectively opening the respective supply paths 71 and 73.

If the lower spray arm 5 is provided rotatably inside the tub 11, the lower spray arm 5 may be rotatably coupled to a holder 17 provided in the sump cover 15, and the first supply path 71 may be provided to supply the washing water to the holder 17.

If the upper spray arm 3 is provided rotatably inside the tub 11, the upper spray arm 3 may be rotatably coupled to the second supply path 73.

As shown in FIG. 2, the pump 8 of the present invention may include an inlet chamber 81 into which the washing water stored in the sump 13 flows, an outlet chamber 83 from which the washing water inside the inlet chamber 81 is discharged outside the inlet chamber 81, an impeller 85 provided in the outlet chamber 83, and a driver 87 provided outside the outlet chamber 83 for rotating the impeller 85.

The inlet chamber 81 may be provided in any shape in which the washing water may be stored. In the example of FIG. 2, the inlet chamber 81 is provided in a cylindrical shape having an opened upper surface.

The inlet chamber 81 includes an inlet 811, and the outlet chamber 83 includes an outlet 812. The inlet 811 is connected to the sump 13 through an inlet connecting pipe 91. The outlet 812 is connected to the switching valve 75 through an outlet connecting pipe 93.

Each of the inlet connecting pipe 91 and the outlet connecting pipe 93 may be made of an elastic material such as rubber that may minimize a transfer of vibrations generated by the pump 8 to the sump 13 and other components.

The outlet chamber 83 provides a space in which the impeller 85 is rotatably received. The outlet chamber 83 may include a cover 831 constituting the upper surface of the inlet chamber 81, and an impeller housing 833 fixed to the lower portion of the cover 831 and connected to the inlet chamber 81.

The impeller 85 is located in the space between the cover 831 and the impeller housing 833, and may be provided in any shape that may move the washing water inside the inlet chamber 81 to the outlet 812.

The impeller housing 833 includes a connecting hole 837 connecting the inlet chamber 81 with the outlet chamber 83, and a housing outlet 835 connecting the outlet chamber 83 with the outlet 812.

When the impeller 85 is rotated, the washing water inside the inlet chamber 81 flows into the outlet chamber 83 through the connecting hole 837, and the washing water in the outlet chamber 83 is supplied to the switching valve 75 through the housing outlet 835 and the outlet 812.

The driver 87 provided to rotate the impeller 85 includes a magnetic field formation unit 873 for producing a rotating magnetic field, and a rotor 871 rotated by the rotating magnetic field produced by the magnetic field formation unit 873, thereby rotating the impeller 85. One example of a magnetic field formation unit 873 is a stator.

The rotor 871 is provided inside a first housing 872 fixed to the outside of the outlet chamber 83. The magnetic field formation unit 873 is provided in a second housing 874 fixed to the outside of the outlet chamber 83, and surrounding the first housing 872.

The magnetic field formation unit 873 is fixed to an inner circumference of the second housing 874 to surround a circumference of the first housing 872.

The magnetic field formation unit 873 may include a core 873a fixed to the inner circumference of the second housing 874, a through hole 873d provided to pass through the core 873a and in which an outer circumference of the first housing 872 is received, a plurality of protrusions 873b protruded towards the center of the through hole 873d at an inner circumference of the core 873a, and a coil 873c provided at the protrusions 873b.

For cooling of the magnetic field formation unit 873, a plurality of radiating holes 875 may be provided passing through the second housing 874.

The rotor 871 is connected to the impeller 85 by a rotation shaft 876 passing through the outlet chamber 83. A plurality of permanent magnets 871a is provided on the outer circumference of the rotor 871 such that magnetic poles (N-pole and S-pole) of the permanent magnets 871a are alternately arranged.

As shown in FIG. 2, the rotation shaft 876 is rotatably supported in the outlet chamber 83 by a friction bearing 877.

The friction bearing 877 may be an oilless bearing which does not need a lubricant. Since an oilless bearing stores lubricant in its inner space, if a surface temperature of the bearing is increased by friction between the rotation shaft 876 and the bearing, the lubricant is supplied to the rotation shaft 876. However, the friction bearing 877 is not limited to an oilless bearing.

Referring to FIG. 3, the friction bearing 877 is provided with a bearing through hole 8771 through which the rotation shaft 876 passes. The surface of the bearing through hole 8771 may be lubricated using the washing water supplied from the outlet chamber 83 to the first housing 872 through a space between the rotation shaft 876 and the bearing through hole 8771 (detailed description will be made later).

The friction bearing 877 passes through the cover 831 of the outlet chamber while being fixed to the outlet chamber 83.

Since it is preferable that the washing water not be supplied through the space between the outer circumference of the friction bearing 877 and the cover 831, a sealer 8773 is provided on the outer circumference of the friction bearing 877 to prevent the washing water inside the outlet chamber 83 from flowing past the outer circumference of the friction bearing 877.

The driver 87 having the aforementioned structure will allow the washing water to be supplied to the first housing 872 through the space between the outer circumference of the rotation shaft 876 and the inner circumference of the bearing through hole 8771 by means of a pressure inside the outlet chamber 83 during rotation of the rotor 871.

If the washing water is supplied into the space between the outer circumference of the rotation shaft 876 and the inner circumference of the bearing through hole 8771, the washing water may lubricate the inner circumference of the bearing through hole 8771, whereby the friction bearing 877 may rotatably support the rotation shaft 876.

In order to assist the supplying of washing water into the first housing 872 through the space between the outer circumference of the rotation shaft 876 and the inner circumference of the bearing through hole 8771 during rotation of the rotor 871, the dishwasher may further include an outlet path 89 for connecting the first housing 872 with the outlet chamber 83.

Since the washing water is pressurized inside the outlet chamber 83 during rotation of the rotor 871, the pressure inside the outlet chamber 83 is higher than that inside the first housing 872. Accordingly, the washing water inside the outlet chamber 83 will move to the first housing 872 through the space between the outer circumference of the rotation shaft 876 and the inner circumference of the bearing through hole 8771, and the washing water supplied into the first housing 872 will move to the outlet chamber 83 through the outlet path 89.

If the rotor 871 provided inside the first housing 872 is in contact with the washing water, durability of the rotor 871 may be reduced. Accordingly, it is preferable that a spacer for uniformly maintaining the spacing between the rotor 871 and the friction bearing 877 is further provided inside the first housing 872.

The spacer may include a first spacer 878 which is in contact with the friction bearing 877, and a second spacer 879 located above the first spacer 878 to support the rotor 871.

The first spacer 878 includes a first body 878a mounted on an upper surface of the friction bearing 877, and a first through hole 878b provided to pass through the first body 878a, into which the rotation shaft 876 is inserted.

The second spacer 879 includes a second body 879a mounted on the first body 878a to support the rotor 871, and a second through hole 879b provided to pass through the second body 879a, into which the rotation shaft 876 is inserted.

Since friction occurs between the lower surface of the first spacer 878 and the upper surface of the friction bearing 877 during rotation of the rotor 871, and friction also occurs between the lower surface of the second spacer 879 and the upper surface of the first spacer 878, washing water is supplied to a contact surface between the first spacer 878 and the friction bearing 877, and to a contact surface between the first spacer 878 and the second spacer 879, thereby lubricating the contact surfaces.

To this end, it is preferable that the first spacer 878 is further provided with a guide path 88. The guide path 88 may include a first guide path 881 provided on the lower surface of the first spacer 878 to guide the washing water to the contact surface between the first spacer 878 and the friction bearing 877, and a second guide path 883 provided on the upper surface of the first spacer 878 to guide the washing water to the contact surface between the first spacer 878 and the second spacer 879.

The first guide path 881 may be provided such that the lower surface of the first spacer 878 is bent concavely (e.g. includes a concavity or a groove therein), and the second guide path 883 may be provided such that the upper surface of the first spacer 878 is bent concavely (e.g. includes a concavity or a groove therein). Alternatively, the second guide path may be provided such that the lower surface of the second spacer 879 is bent concavely.

The washing water supplied into the first housing 872 through the first guide path 881 and the second guide path 883 may move from the first housing 872 to the outlet path 89 by means of a pressure difference between the first housing 872 and a region within the outlet chamber 83 near the outlet path 89.

In order for the washing water inside the first housing 872 to be easily discharged to the outlet chamber 83 through the outlet path 89, the outlet path 89 may be provided in a shape shown in FIG. 4.

As shown in FIG. 4, the outlet path 89 is angled at a predetermined angle with respect to a straight line L1 vertical to a rotation track of the impeller 85 (i.e. a radius line of the impeller 85). The outlet path 89 should be angled toward the housing outlet 835 or the outlet 812.

Although the spacer includes the first spacer 878 and the second spacer 879 in the embodiment of FIG. 3, the spacer of the present invention may include only the first spacer 878 of which one end is in contact with the friction bearing 877 and the other end is in contact with the rotor 871.

In this case, the guide path may include only the first guide path 881 for supplying the washing water to the contact surface between the lower surface of the first spacer 878 and the upper surface of the friction bearing 877.

In the dishwasher of the present invention having the aforementioned structure, if the rotor 871 is rotated as the power is supplied to the magnetic field formation unit 873, the impeller 85 is rotated by the rotation shaft 876.

If the impeller 85 is rotated, the washing water stored in the sump 13 moves to the inlet chamber 81 through the inlet connecting pipe 91 and the inlet 811.

The washing water inside the inlet chamber 81 is supplied to the outlet chamber 83 through the connecting hole 837 and then moves to the switching valve 75 through the outlet 812 and the outlet connecting pipe 93, and the water supplied to the switching valve 75 will be supplied to the upper spray arm 3 or the lower spray arm 5 along the supply paths 71 and 73 opened by the switching valve 75.

Since the pressure inside the outlet chamber 83 is higher than the pressure inside the first housing 872, the washing water inside the outlet chamber 83 will partially be supplied into the first housing 872 through the space between the through hole 8771 of the friction bearing and the rotation shaft 876 to lubricate the contact surface between the first spacer 878 and the friction bearing 877 and the contact surface between the first spacer 878 and the second spacer 879.

Since the washing water that has finished lubrication is discharged from the first housing 872 to the outlet chamber 83 through the outlet path 89, durability of the rotor 871 may be prevented from being deteriorated by the washing water. Also, since the outlet path 89 is angled towards the outlet 812, the washing water inside the first housing 872 is easily discharged to the outlet path 89, because the washing water inside the outlet path 89 is not forced back into the first housing 872.

Although the aforementioned embodiment is described where the pump 8 is provided in the dishwasher, the pump 8 of the present invention may also be applied to various other apparatuses which require movement of water or other liquids.

As described above, according to the present invention, the pump including the friction bearing, and the dishwasher including the pump, may be provided.

Also, according to the present invention, the pump and dishwasher including the pump may be provided, in which the friction bearing is supplied with water to improve its performance and durability.

It will be apparent to those skilled in the art that the present invention can be embodied in other specific forms without departing from the spirit and essential characteristics of the invention. Thus, the above embodiments are to be considered in all respects as illustrative and not restrictive.

The scope of the invention should be determined by reasonable interpretation of the appended claims and all change which comes within the equivalent scope of the invention are included in the scope of the invention.

What is claimed is:

1. A dishwasher comprising:
    a tub providing a washing space;
    a rack located inside the tub and configured to receive washing targets;
    a spray arm configured to spray water to the rack;
    a sump in which the water is received;
    an inlet chamber providing a space into which the water from the sump is supplied;
    an outlet chamber connected with the inlet chamber and configured to guide the water from the inlet chamber to the spray arm;
    an impeller located in the outlet chamber and configured to move the water to the spray arm;
    a first housing fixed on the outlet chamber;
    a rotor rotatably provided inside the first housing;
    a rotation shaft passing through the outlet chamber, the rotation shaft connecting the rotor with the impeller;
    a magnetic field formation unit surrounding the first housing, the magnetic field formation unit configured to produce a rotating magnetic field to rotate the rotor;
    a friction bearing passing through the outlet chamber, the friction bearing rotatably supporting the rotation shaft;
    an outlet path connecting the inside of the first housing with the outlet chamber;
    a spacer through which the rotation shaft passes arranged to maintain a spacing between the rotor and the friction bearing; and
    a guide path provided in the spacer for guiding water supplied into a space formed between the rotation shaft and the friction bearing to a contact surface between the spacer and the friction bearing,
    wherein a rotational axis of the rotation shaft is perpendicular to a horizontal surface to prevent water from contacting the rotor.

2. The dishwasher according to claim 1, wherein the guide path comprises a concavely bent surface of the spacer in contact with the friction bearing.

3. The dishwasher according to claim 1, wherein the spacer comprises:
    a first spacer contacting the friction bearing and through which the rotation shaft passes; and
    a second spacer located above the first spacer to support the rotor and through which the rotation shaft passes, and
    wherein the guide path comprises:
        a first guide path located at a first side of the first spacer which is in contact with the friction bearing; and
        a second guide path located at a second side of the first spacer which is in contact with the second spacer.

4. The dishwasher according to claim 1, wherein the outlet path is angled at a predetermined angle with respect to a line radial of the impeller.

5. The dishwasher according to claim 1, wherein the friction bearing and the rotation shaft are configured to permit the water to pass therebetween and pass from an interior of the outlet chamber to an interior of the first housing; and
    wherein the outlet path is configured to permit the water to pass from the interior of the first housing to the interior of the outlet chamber.

6. The dishwasher according to claim 1, wherein the outlet chamber includes an impeller housing and a cover, wherein the friction bearing is provided in the cover,
wherein the first housing is attached to the impeller housing, and
wherein the cover is located within the first housing.

* * * * *